United States Patent Office 3,512,994
Patented May 19, 1970

3,512,994
METHOD FOR THE PREPARATION OF CONFECTIONERS' FATS
Carl F. Brown and Chester M. Gooding, Westfield, and Stiling F. Knight, Forest Hills, N.J., assignors to CPC International Inc., a corporation of Delaware
No Drawing. Filed July 8, 1966, Ser. No. 563,690
Int. Cl. C11c 3/10
U.S. Cl. 99—118    18 Claims

ABSTRACT OF THE DISCLOSURE

Confectioners' fats are prepared by interesterifying, in the presence of a catalyst, a lauric fat with one or more alkyl esters of fatty acids having 12, 14, or 16 carbon atoms. The interesterification reaction is permitted to reach a state of equilibrium, after which the mixture is brought to an unreactive state, as by removal or destruction of the catalyst. The new alkyl esters resulting from the reaction are removed from the final mixture, and the resultant new triglycerides, which comprise the confectioners' fat, are recovered.

---

This invention relates to an improved method for the preparation of confectioners' fats and to new products resulting from the improved process.

An object of this invention is to provide a process for the repetitive duplication of confectioners' fats of high quality.

Another object of this invention is to improve the yield of confectioners' fats as compared with processes of the present art and to eliminate problems of utilization of by-products which accumulate from the employment of procedures presently known to the art.

Various means have been employed for the purpose of converting and up-grading of natural fats of the types of coconut, palm kernel, babassu, etc. to uses in confectionery coatings and to edible food fats having relatively sharp melting points and brittle physical characteristics at room temperatures. For example, coconut or palm kernel oils have been subjected to controlled crystallization with subsequent filtration or pressing to remove non-crystallized components. The press-cake is known as "fractionated" coconut or palm kernel fat. This process is very costly from the standpoint of cost of the labor requirements and because of the difficulty of utilizing the liquid oil by-products which are no longer characteristic of the parent oil.

It has also been proposed to displace the shorter chain fatty acids from a lauric oil by heating the oil in the presence of a catalyst and longer chain fatty acids under conditions promoting distillation of the displaced shorter chain fatty acids from the reaction mixture. This process does not proceed with any great facility and consequently, during the course of the long time of heating at high temperatures, there is a certain degree of degradation of the reaction mixture with consequent development of color which must subsequently be removed by drastic bleaching. Furthermore, operation of processes which depend upon displacement or fractional crystallization require the selection of an end-point. Each batch of crystals or various portions of a continuous-displacement process are subject to variations in final composition of the treated fat.

Another displacement method has been proposed in which a lauric fat is refluxed with selected alkyl esters in the presence of a catalyst in equipment permitting the distillation of undesired, displaced shorter chain alkyl esters while returning to the reactor the longer chain alkyl esters. The conduct of such a process requires careful fractionation of the refluxing esters and the catalyst has to be replenished from time to time during the relatively long reaction period. Like a number of other processes an end-point has to be chosen and adhered to lest the reaction proceed not far enough or too far.

Another process utilizes directed interesterification wherein a temperature of reaction is chosen at which the desired triglycerides crystallize and separate from the reaction mixture during the course of interesterification. This process is relatively slow and inefficient in that large amounts of liquid triglycerides result as a by-product of the process. The harder and higher melting fraction must be separated by pressing or by solvent crystallization. Other methods utilize solvent crystallization with or without interesterification.

The present invention utilizes an interesterification between (1) a lauric fat (defined hereinafter) and (2) one or more esters of monohydric alcohols and fatty acids having 12, 14 or 16 carbon atoms. (These fatty acids are desirable in a confectioners' fat in that they tend to impart brittleness or "snap" and confer upon the confectioners' fat a relatively high setting point and sharp melting point.) In some cases, it may be desirable to add one or more additional esters of higher molecular weight, e.g. esters of fatty acids having 18 carbon atoms. It is essential to our process that the interesterification reaction be permitted to go to completion, i.e. to reach a state of complete equilibrium, whereby a condition of random distribution of the fatty acid components between the resultant products is achieved. After the state of equilibrium has been reached, the resultant by-product alkyl esters are removed from the mixture and the resultant triglycerides, which are the end product, are recovered.

Before removing the by-product alkyl esters the reaction must be stopped, i.e. the mixtures must be brought to an unreactive state, as by removing and/or destroying the catalyst or otherwise rendering it ineffective. Alternatively, the entire reacted mixture (including the catalyst) may be subjected to flash evaporation under high vacuum in order to remove the by-product alkyl esters; in this case the catalyst is prevented from causing any substantial change of composition of the equilibrated reaction mixture due to the nearly instantaneous removal of the alkyl esters from the reaction mixture. As will be explained more fully hereinafter, a novel feature of our invention, and one which renders it exceptionally practical and useful, is that, by interesterifying to a state of complete equilibrium and random distribution, the composition of the end product is determined entirely by the composition of the initial reactant mixture. Needless to say, if one begins to remove the by-product alkyl esters while the components of the mixture are still capable of reacting with one another, the removal of the alkyl esters will cause the equilibrium to shift and the composition of the resultant triglycerides will be altered accordingly.

By the term "lauric fat" is meant a fat containing a substantial amount of lauric and myristic acids, the total usually being more than 50% of the fatty acids of the glycerides. The remaining fatty acids are predominantly fatty acids having 6, 8, 10, 16 and 18 carbon atoms. Examples of lauric fats are palm kernel, coconut oil, babassu oil and cohune oil and their corresponding partially or completely hydrogenated forms. Some unsaturation in the lauric fat, or in the alkyl esters, or both, is permissible; however, in order to obtain an end product as brittle as possible in the solid state and having as sharp a melting point as possible, the reactants should be so selected as to result in an end product having an iodine value of not greater than 15, and preferably less than about 3.

As monohydric alcohol esters of fatty acids having 12, 14 or 16 carbon atoms (hereinafter referred to as "alkyl esters") any alkyl esters can be used. As a practical matter, however, it is preferable to use esters, the alkyl portion (i.e. the alcohol portion) of which contain 4 carbon atoms or less (lower alkyl), because such esters result in by-product alkyl esters which are more easily separated from the end product.

The entire reaction mixture is ester-interchanged at temperatures preferably below 140° C. by use of a small amount of an alkali metal alkoxide as catalyst, e.g. sodium methylate. A product is obtained of a quality equal to the so-called "fractionated fats" yet no actual fractionation is carried out upon the lauric fat employed nor upon the mixture of triglycerides resulting from the interesterification. The process may be carried out in a continuous method or by a batch process method. The only requirements are that the interesterification reaction of the lauric fat with the alkyl esters be conducted to a complete state of equilibrium and a condition of random distribution of the fatty acid components between the new triglycerides and the new alkyl esters be achieved.

A unique feature of our invention is that after the interesterification reaction has reached equilibrium, the respective fatty acid compositions of the new triglycerides and the new alkyl esters are identical; therefore, the composition of the end product (i.e. the new triglycerides) is determined entirely by, and is predictable from, the composition of the initial reaction mixture. The following equation illustrates the process of the invention:

Lauric Fat+Alkyl Ester(s)→New
Triglycerides+New Alkyl Esters
Equilibrium Mixture of Identical Fatty Acid Compositions The above can be more graphically illustrated in the following manner. Assume about 106 pounds of saturated coconut oil (having a fatty acid content of about 100 pounds) is interesterified with about 107 pounds of methyl laurate (having a lauric acid content of about 100 pounds), and the reaction is permitted to reach a state of complete equilibrium. The following chart illustrates the distribution of the fatty acid components of the initial reactants and of the products resulting from the reaction.

| Identification of the fatty acid component | Distribution of the fatty acid components of the coconut oil (lbs.) | Amount of fatty acid component of the methyl laurate (lbs.) | Distribution of the fatty acid components in the new triglycerides (lbs.) | Distribution of the fatty acid components in the new alkyl esters (lbs.) |
|---|---|---|---|---|
| $C_8$ | 7.9 | | 3.95 | 3.95 |
| $C_{10}$ | 7.2 | | 3.6 | 3.6 |
| $C_{12}$ | 48.0 | +  100.0 → | 74.0 | 74.0 |
| $C_{14}$ | 17.5 | | 8.75 | 8.75 |
| $C_{16}$ | 9.0 | | 4.5 | 4.5 |
| $C_{18}$ | 10.4 | | 5.2 | 5.2 |
| | 100.0 | 100.0 | 100.0 | 100.0 |

We have found that it is desirable to select the reaction components, i.e., lauric fat and alkyl ester(s), in such a way that the new triglycerides contain about 85% of a combination of lauric, myristic and palmitic acids in which combination the lauric acid may be at least about 55%, or the myristic acid about 20% or the palmitic acid about 15%. (The percentages are by weight and are based on the total fatty acid composition.)

The reaction may be conducted at temperatures as high as 140° C. or 150° C., but at these temperatures there is a tendency for the catalyst to become inactivated by interaction with the esters and traces of moisture with formation of soaps; therefore a temperature of below 140° C. is preferred. In most cases the reaction is completed in 15 minutes or less, an hour being more than sufficient to assure complete equilibration. Temperatures below 80° C. may also be used with, of course, attendant longer reaction times. It is necessary that the temperature be such that the reactants be in liquid rather than solid form, in order to achieve a condition of random distribution of the fatty acid components between the new triglycerides and the free alkyl esters.

When the interesterification is complete, the new alkyl esters may be flash-evaporated under high vacuum. Alternatively, the catalyst is destroyed and removed by washing with water with or without acidification. In the latter case, the reacted mixture, which comprises the desired new triglycerides and the new mixture of alkyl fatty acid esters formed in the reaction, is separated as by a rapid evaporation process or by distillation with steam or inert gas under reduced pressure. It is to be emphasized that substantially no further change in the composition of the triglycerides occurs during the evaporation or distillation. After the desired mixture of triglycerides has been freed from the alkyl esters, it is bleached and deodorized in a manner known to the art by which edible oils are refined and deodorized.

The alkyl esters recovered from the reacted mixture may be fractionally distilled and the desired alkyl ester or esters contained in the mixture may be recovered and reused to make an additional quantity of confectioners' fat. The alkyl esters of fatty acids having 6, 8 and 10 carbon atoms constitute the main by-product of the process but not a by-product posing any problem in disposal since there are a number of applications for the esters of the lower fatty acids.

In certain instances, the alkyl-ester portion of the reacted mixture will contain a substantial portion of palmitic and stearic acid esters. For some purposes, it is desirable to separate these esters during the distillation of the by-product esters. In such case, there is available for reuse a middle-cut comprising $C_{12}$, $C_{14}$ and sometimes $C_{16}$ esters which may be recycled to produce more confectioners' fat.

Our invention is illustrated by the following examples, in which all references to parts and to percentages refer to parts and percentages by weight.

EXAMPLE I 500 parts of saturated coconut oil was interesterified at about 90–100° C. with 500 parts of methyl laurate in the presence of 0.3% sodium methylate. After a reaction time of 1 hour, which time more than assured complete equilibration, the reacted mixture was washed with water and the methyl esters resulting from the interesterification were removed by evaporation under reduced pressure. The residual triglycerides were bleached and deodorized. The product had a Wiley melting point of 89.1° F., a setting point of 27.8° C. and an iodine value of 0.6. The Solids Content Indices were determined according to the method of Fulton and Associates (J. Am. Oil Chem. Soc. 31, p. 98 (1954)). These values were 71.3, 62.8, 46.2, and 0.0 at 50° F., 70° F., 80° F. and 92° F. respectively.

EXAMPLE II 700 grams of saturated palm kernel oil of iodine value 0.6 were interesterified for 1 hour at about 90–100° C. with 300 grams of methyl myristate, after which the sodium methylate catalyst was removed by washing with water. The mixture of methyl esters resulting from the interesterification was removed and the triglycerides remaining were bleached and deodorized. The product had a Wiley melting point of 97.9° F. and SCI values of 70.7, 65.7, 58.8, 22.2 and 0.0 at 50° F., 70° F., 80° F., 92° F. and 102° F. respectively.

EXAMPLE III 500 grams of saturated coconut oil were interesterified with 200 grams of methyl laurate and 300 grams of methyl palmitate according to Example II. After removal of the mixture of alkyl esters resulting from the interesterification, the deodorized triglycerides had a Wiley melting point of 99.3° F. and a setting point of 33.9° C. At 50° F., 70° F., 80° F., 92° F. and 102° F. the respective SCI values were 65.5, 57.9, 48.0, 19.1 and 0.0.

EXAMPLE IV 500 grams of saturated coconut oil are ester-interchanged with 183 grams of isopropyl laurate, 81 grams of n-propyl myristate and 36 grams of isopropyl palmitate at about 90–100° C. After the reaction has proceeded for 1 hour the propyl esters resulting from the interesterification are removed and the residual triglycerides are bleached and deodorized.

The product has a Wiley melting point of 93.0° F. and SCI values of 64.2, 54.4, 36.9 and 0.0 at 50° F., 70° F., 80° F. and 92° F. respectively.

EXAMPLE V 70 parts of saturated palm kernel oil were interesterified with 30 parts of methyl palmitate according to the foregoing examples, except that the reaction time was reduced to ½ hour. The deodorized residue of triglycerides had a Wiley melting point of 106.3° F. and a setting point of 35.9° C. SCI values were 67.0, 60.6, 52.7, 29.2 and 6.6 at 50° F., 70° F., 80° F., 92° F. and 102° F. respectively.

EXAMPLE VI 600 pounds of hydrogenated palm kernel oil having a Wiley melting point of 110.5° F., a setting point of 33.6° C. and an iodine value of 1.4 was mixed with 444 pounds of 96% commercial methyl laurate and 156 pounds of 94% commercial methyl myristate. The mixture was interesterified for about 1 hour at about 85° C. by the addition of 817 grams of sodium methoxide. The product was washed three times by the addition of 120 pounds of hot water with intermediate settling and discarding of the water phase. The oil layer was dried and bleached with 2% of an acid-activated clay.

The filtered product was stripped of the major portion of methyl esters resulting from the interesterification reaction in a thin-film evaporator operated under reduced pressure. The stripped product was then deodorized, a process which completed the stripping operation, to yield a product of the following characteristics. The corresponding values are given for the hydrogenated palm kernel oil before its equilibration with methyl esters according to the process of this invention.

|  | Hydrogenated palm kernel oil (starting material) | New triglycerides (end product) |
|---|---|---|
| Melting point Wiley, ° F | 110.5 | 93.8 |
| Setting point, ° C | 33.6 | 28.8 |
| Iodine value | 1.4 | 0.9 |
| Solids content index (° F.): |  |  |
| 50 | 71.6 | 70.7 |
| 70 | 61.7 | 64.6 |
| 80 | 43.1 | 47.9 |
| 92 | 16.5 | 0.0 |
| 102 | 6.0 | 0.0 |

The product of this example was found to have the following fatty acid composition by gas-liquid chromatography expressed as area-percent:

|  | Percent |
|---|---|
| $C_6$ | 0.1 |
| $C_8$ | 2.2 |
| $C_{10}$ | 2.2 |
| $C_{12}$ | 61.1 |
| $C_{14}$ | 20.8 |
| $C_{16}$ | 4.2 |
| $C_{18}$ | 8.1 |

Other examples, which illustrate the practice of this invention, include the interesterification of: 90 parts of completely hydrogenated coconut oil with 10 parts of ethyl palmitate; 85 parts of completely hydrogenated palm kernel oil with 15 parts of n-propyl laurate; 80 parts of saturated babassu fat with 20 parts of isopropyl myristate; and 75 parts of saturated cohune nut fat with a mixture of 16 parts of methyl laurate, 5 parts of methyl myristate and 4 parts of methyl palmitate. The products resulting from the aforementioned reactions possess the brittleness and sharp melting points necessary in a confectioners' fat.

While the invention has been described herein by reference to specific embodiments thereof, it should be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:
1. A process of preparing a confectioners' fat consisting essentially of:
   interesterifying in the presence of a catalyst, at a temperature of below about 150° C. and sufficiently high to maintain the reactants in liquid form,
   a lauric fat with
   a member selected from the group consisting of
   alkyl esters of fatty acids having 12 carbon atoms,
      alkyl esters of fatty acids having 14 carbon atoms,
      alkyl esters of fatty acids having 16 carbon atoms,
      and mixtures thereof;
   until the interesterification reaction reaches a state of equilibrium;
   bringing the resultant reacted mixture to an unreactive state;
   separating the resultant alkyl esters from the resultant triglycerides; and
   recovering the resultant triglycerides;
   wherein the reactants are selected in such a way that said resultant triglycerides contain about 85%, by weight, based on the total fatty acid composition, of a combination of lauric, myristic and palmitic acids.

2. The process of claim 1 wherein the reacted mixture is brought to an unreactive state by removal of the catalyst.

3. The process of claim 1 wherein the reacted mixture is brought to an unreactive state by destruction of the catalyst.

4. The process of claim 1 wherein the reactants are sufficiently saturated so that the resultant confectioners' fat has an iodine value of not greater than 15.

5. The process of claim 1 wherein the reactants are sufficiently saturated so that the resultant confectioners' fat has an iodine value of less than about 3.

6. The process of claim 1 wherein the resultant alkyl esters are removed from the reacted mixture by evaporation.

7. The process of claim 1 wherein at least a part of the alkyl ester reactant is derived from the by-product alkyl esters recovered from a previous reaction.

8. The process of claim 1 wherein the lauric fat is interesterified with a member selected from the group consisting of methyl laurate, methyl myristate, methyl palmitate, ethyl laurate, ethyl myristate, ethyl palmitate, n-propyl laurate, n-propyl myristate, n-propyl palmitate, isopropyl laurate, isopropyl myristate, isopropyl palmitate, and mixtures thereof.

9. The process of claim 1 wherein the reactants are selected in such a way that the resultant triglycerides contain at least about 55%, by weight, based on the total fatty acid composition, of lauric acid.

10. The process of claim 1 wherein the reactants are selected in such a way that the resultant triglycerides contain at least about 20%, by weight, based on the total fatty acid composition, of myristic acid.

11. The process of claim 1 wherein the reactants are selected in such a way that the resultant triglycerides contain at least about 15%, by weight, based on the total fatty acid composition, of palmitic acid.

12. A process for the preparation of a confectioners' fat consisting essentially of:
   reacting together, in the presence of an interesterification catalyst, at a temperature of below about 150° C. and sufficiently high to maintain the reactants in liquid form, until an equilibrium mixture is obtained, the following reactants:
   (a) a triglyceride fat, the fatty acid component of which is primarily lauric acid, and
   (b) a lower alkyl ester the fatty acid component of which is primarily selected from the group consisting of lauric acid, myristic acid, palmitic acid, and mixtures thereof,
   to obtain an equilibrium mixture that contains:
   (a) resultant alkyl esters of the fatty acid components in the equilibrium mixture,
   (b) resultant new triglycerides in which at least some of the fatty acid component is derived from the fatty acid component of the reactant alkyl ester, and
   (c) the catalyst; and then recovering the resultant new triglycerides without permitting further reaction to occur;
   wherein the reactants are selected in such a way that said resultant triglycerides contain about 85%, by weight, based on the total fatty acid composition, of a combination of lauric, myristic and palmitic acids.

13. A process in accordance with claim 12 wherein the reactant lower alkyl ester is a methyl ester.

14. A process in accordance with claim 12 including the step of removing the resultant alkyl esters from the reacted mixture before recovering the resultant new triglycerides.

15. A process in accordance with claim 14 wherein the resultant alkyl esters are removed from the reacted mixture by subjecting said reacted mixture to flash evaporation under high vacuum.

16. The process of claim 12 wherein the reactants are selected in such a way that the resultant triglycerides contain at least about 55%, by weight, based on the total fatty acid composition, of lauric acid.

17. The process of claim 12 wherein the reactants are selected in such a way that the resultant triglycerides contain at least about 20%, by weight, based on the total fatty acid composition, of myristic acid.

18. The process of claim 12 wherein the reactants are selected in such a way that the resultant triglycerides contain at least about 15%, by weight, based on the total fatty acid composition, of palmitic acid.

References Cited

UNITED STATES PATENTS

| | | | |
|---|---|---|---|
| 2,418,898 | 4/1947 | Murphy et al. | 260—410.7 |
| 2,726,158 | 12/1955 | Cochran et al. | 99—118 |
| 3,174,868 | 3/1965 | Teasdale et al. | 99—118 |
| 3,396,037 | 8/1968 | Bell et al. | 99—118 |

FOREIGN PATENTS 249,916   3/1926   Great Britain.

OTHER REFERENCES

Bailey, A. E., Industrial Oil and Fat Products, 1951, Interscience Publ., Inc., New York, pp. 813, 828.

MAURICE W. GREENSTEIN, Primary Examiner

U.S. Cl. X.R.

260—410.7